United States Patent
Shait et al.

(10) Patent No.: US 8,179,875 B2
(45) Date of Patent: May 15, 2012

(54) PROVISIONING OF NON REAL TIME SERVICES IN ACCORDANCE WITH NETWORK RESOURCES AVAILABILITY

(75) Inventors: Dvora Shait, Even Yehuda (IL); Naftali Chayat, Kfar Saba (IL)

(73) Assignee: Alvarion Ltd., Tel-Aviv (IL)

( * ) Notice: Subject to any disclaimer, the term of this patent is extended or adjusted under 35 U.S.C. 154(b) by 823 days.

(21) Appl. No.: 11/767,834

(22) Filed: Jun. 25, 2007

(65) Prior Publication Data

US 2008/0316992 A1 Dec. 25, 2008

(51) Int. Cl.
*H04W 4/00* (2009.01)
(52) U.S. Cl. ........ 370/341; 370/328; 370/338; 370/237; 455/452.1; 455/452.2; 455/453; 709/226; 709/228; 709/229
(58) Field of Classification Search .......... 370/328–329, 370/338, 341, 395.1, 395.21, 395.43, 395.4, 370/331; 709/228, 232; 455/436
See application file for complete search history.

(56) References Cited

U.S. PATENT DOCUMENTS

| | | | |
|---|---|---|---|
| 2004/0063497 A1 | 4/2004 | Gould | |
| 2005/0228892 A1* | 10/2005 | Riley et al. | 709/228 |
| 2005/0272438 A1 | 12/2005 | Holur et al. | |
| 2006/0104232 A1* | 5/2006 | Gidwani | 370/328 |

* cited by examiner

*Primary Examiner* — Nick Corsaro
*Assistant Examiner* — Babar Sarwar
(74) *Attorney, Agent, or Firm* — Abraham Hershkovitz; Harold L. Novick; Hershkovitz & Associates LLC

(57) ABSTRACT

A method is described for the provisioning of latency-tolerant services in an access network. The method comprises the steps of: setting a demand to provide a service to a user; determining the network resources required to provide this service; establishing based upon the resources required to provide that service, the available network resources and/or the network's service provisioning policy, whether the provisioning of this service shall be immediately effected or be postponed to a later stage. If it has been established that the service will be provided at a later stage, it will be provided at a time when the available resources and/or the network's service provisioning policy match that of the resources required for the provisioning of the service.

20 Claims, 2 Drawing Sheets

PROVISIONING OF NON REAL TIME SERVICES IN ACCORDANCE WITH NETWORK RESOURCES AVAILABILITY

FIELD OF THE INVENTION

The present invention relates to wireless communications networks and, in particular, to utilizing the wireless network resources by the end users.

BACKGROUND OF THE INVENTION

Nearly all modern computing devices contain communications and data exchange capabilities. Laptop computers as well as Personal Digital Assistant (PDA) devices are routinely augmented with wireless communication capabilities. Cellular phones evolve to contain substantial amounts of storage and execute user applications or store data, such as contact lists, appointments, songs and video clips, and to support computing capabilities. Within this realm appeared the need for low priority data exchange between remote locations. Examples of such data exchange transactions are backup and restore of information, download of non-urgent information, antivirus database updates, subscription based song download, pushing of commercials to user terminals, and so on.

Modern communication networks and in particular wireless and mobile networks experience significant fluctuations of load from location to location and along the day. Communication service providers are trying to balance the network load by providing incentives to communicate during off-peak hours, such as by offering lower phone call tariffs at certain hours.

One of the applications discussed above is backup storage for which certain solutions have been proposed in the art.

US 20020156921 describes data back-up method for wireless device, which is based on receiving data from wireless device in response to a request for data back-up and storing the received data in a memory that is connected to network, and the service is provided when the device is in its idle mode.

US 20020111190 describes a base station that is used also for storing data from a portable data storage device, such as a personal digital assistant (PDA). The base station comprises a data storage device and a power supply. The PDA downloads data into the storage device and recharges an internal power source from the power supply. The data is stored in the base station as back-up of the data on the PDA.

However, none of the solutions discussed in the art have envisioned balancing (up to a certain degree) the load in access networks by encouraging the use of applications, which are carried out during off-peak periods of low/reduced load in the relevant access network.

Some of the access related standards that have been and are being developed by certain standardization bodies provide mechanisms to prioritize the user traffic according to its urgency (e.g. DOCSIS ("Data Over Cable Service Interface Specification") and the Broadband Wireless Access standards IEEE 802.16 and ETSI's—HIPERMAN).

Five scheduling services are defined by these standards as mechanisms to meet the quality of service needs of the data flows carried over the airlink, both in the upstream and downstream directions. The scheduling service is associated to each connection at connection setup time. It determines the policy by which the connection (or the user terminal) is being polled and/or granted transmission opportunities.

Nevertheless, even the service with the least priority according to these standards, i.e. the Best Effort class of service, does not address the option of providing latency tolerant services which can tolerate delays on the order of minutes and hours, when appropriate network resources are available.

SUMMARY OF THE INVENTION

It is an object of the present invention to allow the users to utilize efficiently available resources of their access network.

It is another object of the present invention to provide the network operator with capabilities to provide a user with services and/or applications while using efficiently the bandwidth resources and particularly during low-load (e.g. off-peak) periods.

It is another object of the present invention to provide a method and device that enable providing a user with services and/or applications without having to contact external providers in order to receive these services/applications.

Other objects of the invention will become apparent as the description of the invention proceeds.

Thus, according to an embodiment of the present invention, there is provided a method for provisioning of services in an access network. The method comprises the steps of:

setting a demand for one or more services to be provided to a user;

determining network resources required to provide at least part of said one or more services;

establishing whether the at least part of said one or more services would be provided immediately or at a later stage, based upon available network resources and/or network's service provisioning policy and said required resources;

if it has been established that said at least part of the one or more services would be provided at a later stage, providing the one or more services at a time when network's available resources and/or network's service provisioning policy match that of the network resources required for the provisioning of said one or more services.

The terms "demand", "request" or "requirement" as used herein and throughout the specification and claims in connection with the one or more services to be provided, should be understood as interchangeable with each other. Typically, the demand/request/requirement will be initiated either at the subscriber side when the subscriber wishes to receive such a service and is willing to accept that the service will not be a real-time service, or alternatively such a demand can be initiated at the network side, e.g. based on service supply agreement existing between the user and his/her service provider.

Although the demand is initiated for one or more services, still, as will be appreciated by those skilled in the art, there could be instances when part of the required service may be fulfilled immediately, while the remaining part of that service should be deferred to a later stage. Thus, the present invention should be understood to encompass also these cases where according to the available network resources and/or network's service provisioning policy part of the required service is fulfilled while the other part of the service as delayed to a later stage.

According to a preferred embodiment of the invention, the access network is member of a group consisting of: a wireless network, a mobile wireless network, a cellular mobile network, a cable-modem network, and a DSL network.

By yet another preferred embodiment of the invention, the step of establishing whether the at least part of the one or more services would be provided immediately or at a later stage, is based upon a determination whether traffic load associated with one or more entities operative along a path extending between the provider of the required service and the user's communication terminal, does not exceed a pre-defined threshold.

According to still another embodiment of the invention, the step of establishing whether the at least part of the one or more services would be provided immediately or at a later stage, is based upon information retrieved from one or more management entities associated with network elements located along a path extending between the provider of the required service and the user's communication terminal.

By yet another embodiment of the invention, the step of establishing whether the at least part of the one or more services would be provided immediately or at a later stage, is based upon information retrieved from at least one agent located either at the user side or the provider side or at both sides, and wherein that agent(s) is operative to asses period of time required to convey data from one side of a path extending between the provider of the required service and the user's communication terminal, to the other under current traffic load.

According to another embodiment of the present invention, the step of establishing whether the at least part of the one or more services would be provided immediately or at a later stage, is based upon measuring the latency of data transfer over a low-priority connection. In many cases, the management elements are not accessible to the end user or to the service provider. In such cases, it would be advantageous to assess the network load by indirect means. One such means is to measure the latency of transmissions, as latency would typically increase when the load increases. Another means is to establish a low priority data stream and to measure the actual throughput granted to such stream. For example, a best effort connection can be established between the communication terminal and the service provider. Based upon the rate of receiving communications (e.g. a probe signal) along that connection, the network's load and/or the possibility to comply with the user's demand at that time, can be determined. All these methods and others, which are known in the art per se, should be understood to be encompassed within the scope of the present invention.

In accordance with another embodiment of the invention, the step of establishing whether the at least part of the one or more services would be provided immediately or at a later stage, is based upon a response transmitted by a base station to a communication terminal's request to establish a new data connection.

By yet another embodiment, the step of determining is performed by the communication terminal. In the alternative, the step of determining is performed by a network management entity.

In accordance with another preferred embodiment of the present invention, the method provided further comprising a step of storing at a management entity associated with the access network, an indication related to the demand for the one or more services, in case the demand has not yet been fulfilled. Preferably, the indication further comprises information related to the resources required to comply with the demand and/or with the network's service provisioning policy.

A required service referred to herein is preferably a member of the group consisting of: storage of information available at the communication terminal, backup of information stored at the communication terminal, downloading information to the communication terminal, downloading applications to the communication terminal, activating applications already available at the communication terminal, uploading stored information to the communication terminal, automatic virus scanning, automatic or cheaper applications download, automatic or cheaper connection to internet sites, and the like.

In accordance with another aspect of the invention, there is provided a computer program product stored on a non-transitory computer readable media for use in a data processing system implemented as a proxy server for facilitating the provisioning of services to a user of a communication terminal. The computer program product comprising: first instructions for enabling receipt of a request for service to be provided to the user (where such a request may be initiated either at the communication terminal, e.g. by the user, or as an automated process, or at the provider's end as part of the service to which the user had subscribed); second instructions to enable determining whether current available network resources are sufficient to comply with that request for service; third instructions to enable transmission of an indication related to the requested service; forth instructions to enable exchanging information between a communication terminal of said user and the service provider's server.

The forth instructions referred to hereinabove, comprise instructions to enable downloading of information to the user's communication terminal, or to enable uploading information from the user's communication terminal, or any combination of uploading and downloading information from/to the user's communication terminal, depending on type of the service(s) to be provided.

The indication referred to herein can be an indication used to inform the user when the network has the resources required to provide the requested service, or to inform the user that the service has already been provided (partially or in full), as the case may be. According to still another aspect of the invention, there is provided a communication device adapted for use in a communication access network and to allow provisioning of non real time services to a user of a communication terminal associated with that access network, during a period at which there are sufficient available network resources. The communication device comprising:

an identifying unit operative to receive a request for provisioning of one or more services to the user;

a resource assessment unit operative to determine availability of resources required to comply with that request and to determine whether the one or more services requested (or at least part thereof) would be provided immediately or at a later stage;

a service provisioning unit operative in accordance with a determination made by the resource assessment unit to initiate the provisioning of at least part of said requested one or more services; and a transceiver operative to receive data from a communication terminal of the user and/or transmit data thereto.

Preferably, the communication device further comprises a storing unit operative to store data received from the communication terminal and/or to transmit data thereto.

By still another embodiment of the invention, the communication device further comprises means operative to measure (preferably on a periodic basis) the network traffic load, and to provide the outcome of the measurement to the resource assessment unit. This outcome could be provided for example only when it is below a pre-defined threshold or in any other applicable way.

According to yet another embodiment of the invention, the communication device further comprising means adapted to establish connection with the communication terminal when sufficient network resources become available to comply at least partially with the request for provisioning the one or more services.

DETAILED DESCRIPTION OF THE INVENTION

Figure 1:
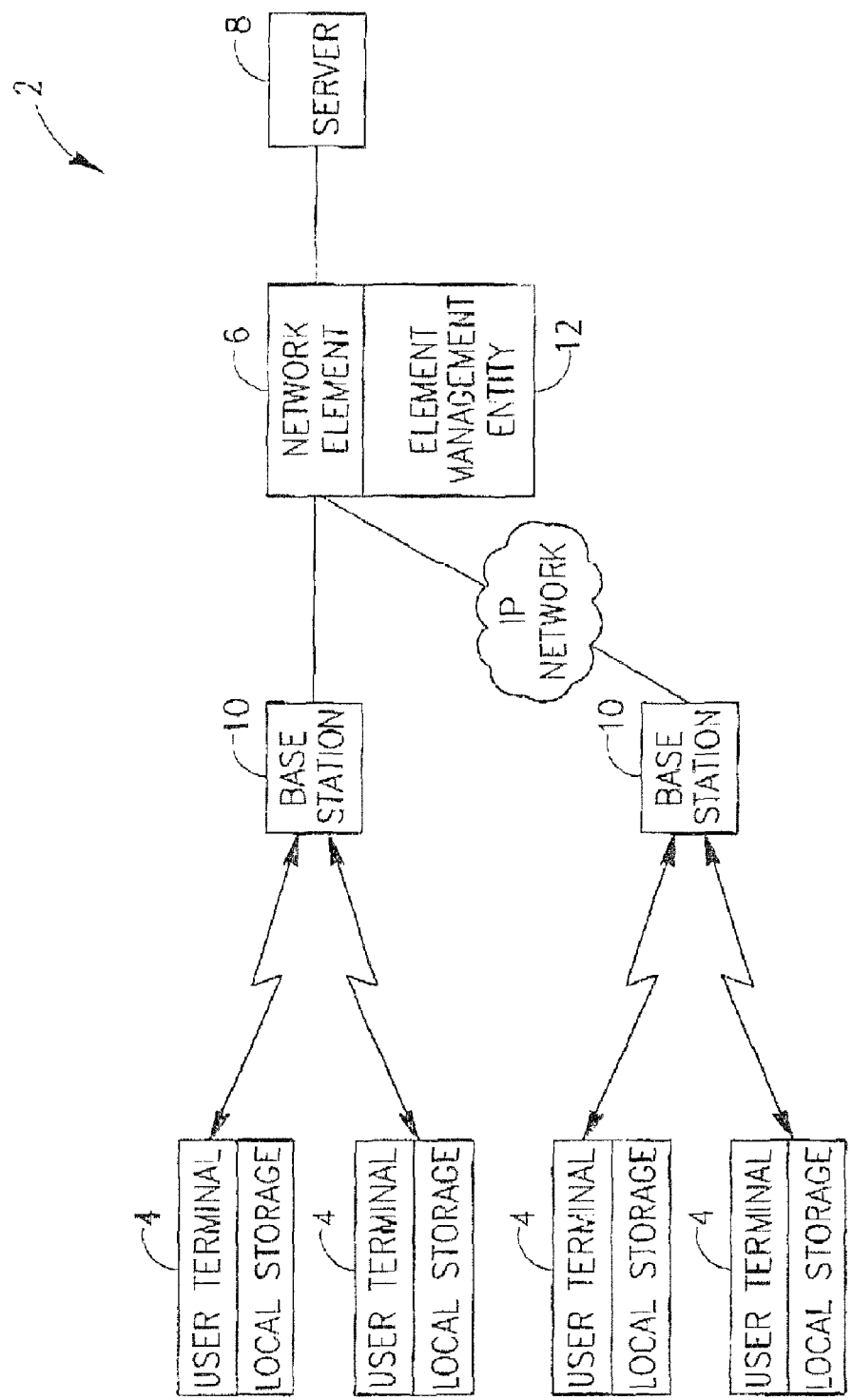
FIG. 1—presents a block diagram of a wireless system operative to provide services to user terminals in accordance with the present invention.

A better understanding of the present invention is obtained when the following non-limiting detailed description is considered in conjunction with the following drawings.

As will be appreciated by those skilled in the art, one of the objects of the method provided by the present invention, is, to allow the operator to manage its wireless network in an efficient way while offering additional services (such as new applications) to the network's subscribers, preferably, without the subscribers being bothered to make a contact with external providers to enable the applications, or activate them. For example, a typical user will not perform periodic virus scan, or constantly search for the recent anti-virus updated versions, and then download it and activate it periodically. But that user is likely to answer in the affirmative if offered to be an option that these services are automatically performed. Since there is no real importance on the exact moment at which this service is performed, the network's management shall insure that performing the service will not have an adverse effect upon the regular wireless transportation, and will schedule the performance of this service in non busy hours—as opposed to a situation where the user communicates with his/her service provider over the Internet to carry out the process associated with that service. In the latter case, all traffic exchanged during the time of carrying out the process, is conveyed irrespective of the network current traffic load.

Similarly, a periodic backup can be carried for information contained at the user's laptop/handheld device.

Preferably, for a network that is adapted to operate in accordance with the WiMAX international standard, the administrative WiMAX information, including load of the network, may be used while providing required services to the subscriber. The information about the network load can be acquired from the admission control, and may be activated by it or by the ISP connected thereto.

Let us now consider an example of backup storage, where information available at the end user's equipment (laptop, PDA, cellular phone, etc.) is to be backed up in accordance with the present invention. Once the user expresses his/her wish to subscribe to this service, by sending a message which comprises this request, the network's management associates this user with the requested service. The user will then provide his/her backup requirements, e.g. preferred period for carrying out the backup process, the material that should be backed up (e.g. which directories and/or file types), whether the backup should be incremental or full, etc. These requirements are then forwarded to the backup application, which in turn would associate these requirements to its backup list, and shall initiate a backup process at every predefined period of time during non-busy hours (e.g. at nights) in a way that fits the user's requirements. Retrieval of stored information shall be done upon receiving a further request from the user, indicating his/her wish to retrieve all or part of the stored information.

A typical system adapted to be operative in accordance with the present invention is illustrated schematically in FIG. 1. Network 2 comprises base station(s) 10, user terminals 4 (e.g. a Customer Premises Equipment, "CPE") preferably comprising local storage having a predefined directory for providing the appropriate instructions for the required backup, network element 6 (or an ISP) comprising a management entity 12 connected to server 8 for the provisioning of storage means (e.g. disks of its own or storage volume with storage companies, etc). Management entity 12 is operative as a backup/restore application, in order to provide the required service. Management entity 12 receives a message transmitted by user terminal 4 towards base station 10, indicating that the user of terminal 4 wishes to be provided with storage service. Then management entity 12 checks this request against the traffic load experienced by the various entities located along the path extending from the user terminal to the storage facility, in order to establish whether the required backup can be carried out. If current traffic load does not permit carrying out the backup process, management entity 12 will repeat this check later on, until the appropriate conditions as were pre-defined by the network operator are met and the backup process may then be conducted.

The user's communication terminal may have an intermediate state of operation between on and off, so the backup could be done transparently while the user terminal is at this state. Preferably, the backup will take place when user terminal 4 is either active (state is "on") or in a power saving mode.

Preferably, the backed up files would be stored in an encoded form (for security reasons) at server's 8 storage means. Such encoding may be done by using a public key and private key, or any other method known in the art per se.

Figure 2:
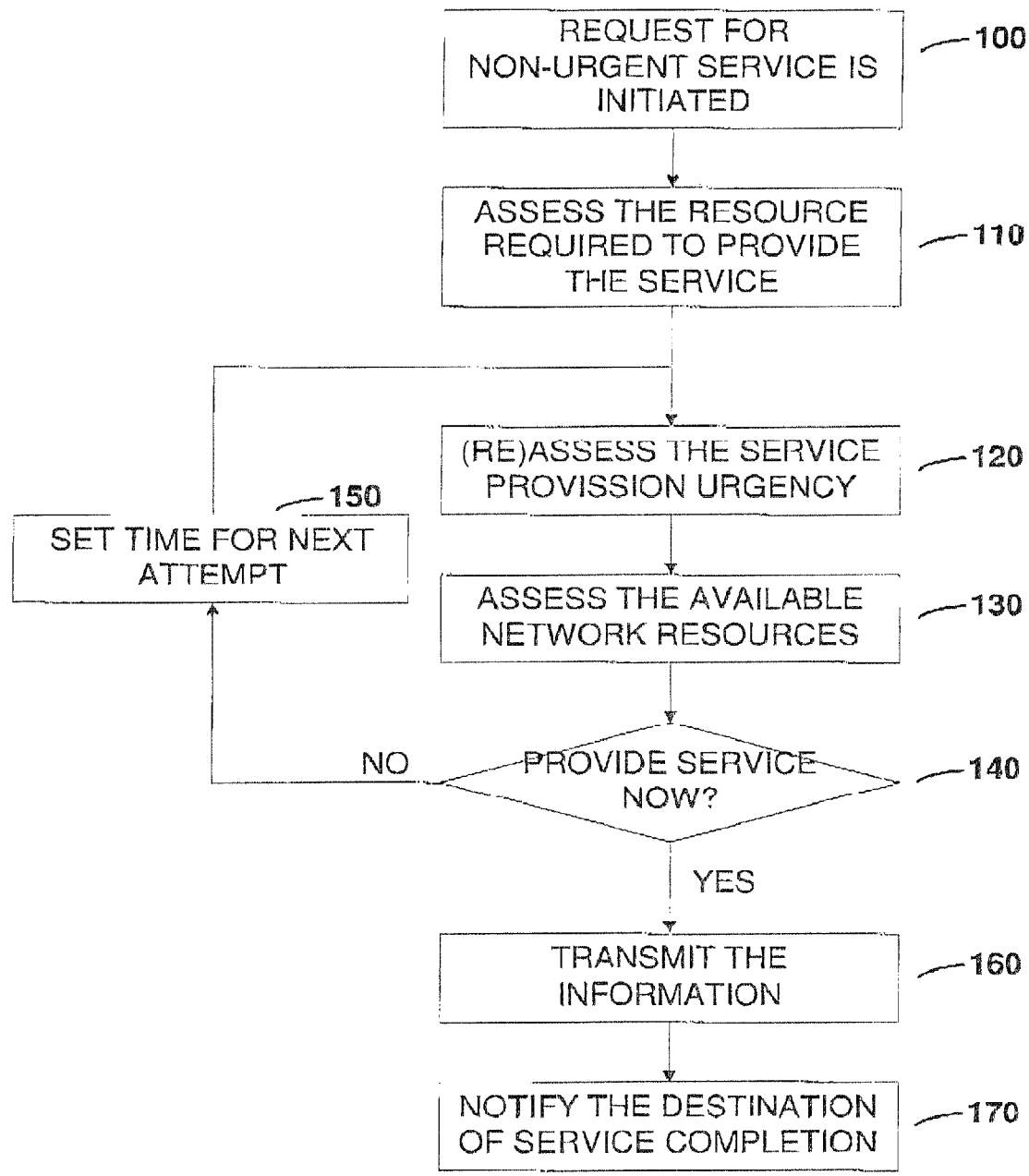
FIG. 2—presents a flow chart demonstrating the method provided by the present invention.

Let us now consider FIG. 2 which is a schematic flow chart of a method exemplifying the present invention for another application. The user has subscribed to a service by which he is provided with a summary of every day's news, which can be received at any time between 19:00 to 22:00. The provider of this service includes the user in the list of subscribers. Every day at 19:00, the provider's application re-initiates a request to provide the subscriber with the required service, i.e. the news summary, (step 100) to the respective management entity. The management entity then assesses the network resources required to provide the service (step 110), the service provisioning urgency, typically in accordance with the network priority policy (step 120) and the network available resources (step 130) and then makes a decision whether the service should be provided now or later (step 140). Every pre-defined period of time, the network management entity is informed of the currently available resources, and if the network resources are not sufficient to provide the resources required for the provisioning of the service (e.g. the time required for a return trip of a ping sent from the provider's side network element to the subscriber terminal and back is more than the pre-defined threshold of say 200 msec), time is set for next attempt (step 150). However, if the network resources are sufficient to provide the resources required for the provisioning of the service, the new summary will be transmitted to the user (step 160) and the user will receive an indication upon completion of downloading the summary (step 170).

In addition or on the alternative, the operator may further keep a database (DB) comprising a list of all users who had subscribed to that service, and at 19:00, steps 100 to 130 of the flow chart described above are carried out for each of the subscribers (in fact, the result of step 110 is practically the same for all users receiving the same news summary). Then an algorithm is operated to decide based on known current traffic load for each one of the subscribers who could receive the service, according to the load associated with the link connecting to that user. When the algorithm finds a subscriber to whom the path is relatively unloaded, the management entity continues by the transfer of data (step 160). For the other subscribers, the next step would be setting a new time (step 150) to repeat steps 120 to 140.

As will be appreciated by those skilled in the art, the example provided shows a backup procedure. However, similar processes may be applied in a similar way in order to provide the user with additional services by the network operator, without departing from the scope of the present invention.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. A method for provisioning of user services in an access network, the user services are latency-tolerant, non-real time services including storage of information available at a communication terminal, backup of information stored at a communication terminal, downloading information to a communication terminal, downloading applications to a communication terminal, activating applications already available at a communication terminal, uploading stored information to a communication terminal, automatic virus scanning, automatic or cheaper applications download, automatic or cheaper connection to internet sites, and including user services of type having parts that are transferred at different times, the method comprises the steps of:
   setting a demand for one or more user services for a user;
   determining network resources required to transfer at least part of said one or more user services;
   establishing whether the network resources required to transfer the at least part of said one or more user services are currently available, or whether the at least part of said one or more user services are transferred at a later stage, at a time when network resources required to comply with said provisioning of user services become available, the exact time for the provisioning of said one or more user services is not determined at the time of establishing that the at least part of said one or more user services are transferred at said later stage; and
   when it has been established that the at least part of said one or more user services are transferred at a later stage, transferring the at least part of said one or more user services when the network's available resources currently match that of the network resources required for the transferring of the at least part of said one or more user services, wherein the exact time for the provisioning of said one or more user services is not known, and has not been predicted at the time of establishing whether the at least part of said one or more user services are transmitted at said later stage.

2. The method according to claim 1, wherein said access network is member of a group consisting of: a wireless network, a mobile wireless network, a cellular mobile network, a cable-modem network, and a DSL network.

3. The method according to claim 1, wherein the step of establishing whether the network resources required to provide at least part of said one or more user services are currently available, or whether the at least part of said one or more user services would be transferred at a later stage, is based upon a determination whether traffic load associated with one or more entities operative along a path extending between the provider of the required service and the user's communication terminal, does not exceed a pre-defined threshold.

4. The method according to claim 1, wherein the step of establishing whether the network resources required to provide at least part of said one or more user services are currently available, or whether the at least part of said one or more user services would be transferred at a later stage, is based upon an information retrieved from one or more management entities associated with network elements located along a path extending between the provider of the required service and the user's communication terminal.

5. The method according to claim 1, wherein the step of establishing whether the network resources required to provide the at least part of said one or more user services are currently available, or whether the at least part of said one or more user services would be transferred at a later stage, is based upon information retrieved from at least one agent located at the user side or the provider side or at both sides, and operative to assess period of time required to convey data from one side of a path extending between the provider of the required service and the user's communication terminal, to the other.

6. The method according to claim 1, wherein the step of establishing whether the network resources required to provide the at least part of said user services are currently available, or whether the at least part of said one or more user services would be transferred at a later stage, is based upon measuring the latency of data transfer over a low-priority connection.

7. The method according to claim 1, wherein the step of establishing whether the network resources required to provide the at least part of said one or more user services are currently available, or whether the at least part of said one or more user services would be transferred at a later stage, is based upon a response transmitted by a base station to a communication terminal's request to establish a new data connection.

8. The method according to claim 1, wherein the step of determining network resources required to transfer at least part of said one or more user services, is performed by the communication terminal.

9. The method according to claim 1, further comprising a step of storing at a management entity associated with said access network, an indication related to said demand for the one or more services, in case the demand has not yet been fulfilled.

10. The method according to claim 9, wherein said indication further comprises information related to the resources required to comply with said demand and/or with said network's service provisioning policy.

11. The method according to claim 1, wherein said one or more latency-tolerant, non real time services is defined as being a member of the group consisting of: storage of information available at the communication terminal, backup of information stored at the communication terminal, downloading information to the communication terminal, downloading applications to the communication terminal, activating applications already available at the communication terminal, uploading stored information to the communication terminal, automatic virus scanning, automatic or cheaper applications download, automatic or cheaper connection to internet sites, or any combination thereof.

12. A communication device configured to be used in a communication access network and to allow provisioning of latency-tolerant, non-real time user services to a user of a communication terminal associated with said access network during a period at which there are sufficient available network resources, the user services including storage of information available at a communication terminal, backup of information stored at a communication terminal, downloading information to a communication terminal, downloading applications to a communication terminal, activating applications already available at a communication terminal, uploading stored information to a communication terminal, automatic virus scanning, automatic or cheaper applications download, automatic or cheaper connection to internet sites, and including user services of type having parts that are transferred at different times, wherein said communication device comprising:

an identifying unit configured to receive a request for provisioning of one or more latency-tolerant, non-real time user services to said user;

a resource assessment unit operative to determine whether at least part of said one or more latency-tolerant, non-real time user services is transferred instantly or whether a determination is made successively at one or more of later stages until the determination is made to transfer the at least part of said one or more latency-tolerant, non-real time user services instantly at that later stage, and in a case where the determination is made not to then transfer the at least part of said one or more latency-tolerant, non-real time user services at that later stage, to make a further determination at a still later stage whether they are transferred, and to notify a service provisioning unit as soon as the time at which network resources required to comply with said request become available;

a service provisioning unit configured to in response to a determination made by said resource assessment unit that the resources required to comply with said request become currently available to initiate the transfer of at least part of said requested one or more services; and a transceiver configured to receive data from a communication terminal of said user and/or transmit data thereto.

13. The communication device according to claim 12, further comprising a storing unit operative to store data received from said communication terminal and/or to transmit data thereto.

14. The communication device according to claim 12, further comprising means operative to measure the network traffic load, and to provide the outcome of said measurement to said resource assessment unit.

15. The communication device according to claim 12, further comprising means adapted to establish connection with the communication terminal when sufficient network resources become available to comply at least partially with said request for provisioning of said one or more services.

16. A method for provisioning of latency-tolerant, non-real time user services in an access network, the user services including storage of information available at a communication terminal, backup of information stored at a communication terminal, downloading information to a communication terminal, downloading applications to a communication terminal, activating applications already available at a communication terminal, uploading stored information to a communication terminal, automatic virus scanning, automatic or cheaper applications download, automatic or cheaper connection to internet sites, and including user services of type having parts that are transferred at different times which comprises the steps of:

a. setting a request for one or more latency-tolerant, non-real time user services for a user;

b. determining network resources required to transfer at least part of said one or more latency-tolerant, non-real time user services, denoted said user service part;

c. establishing whether said user service part is transferred immediately, in which case transferring said user service part immediately;

d. when it is established that said user service part is not transferred immediately, establishing at a later stage if the network resources required to comply with said request have become available, wherein said step comprises that the exact time for the provisioning of said user service part is not determined at the time of establishing that said user service part is transferred at said later stage;

e. when it has been established that said user service part is transferred at a time in a later stage, then at a later stage, then undetermined, establishing whether the network resources required to transfer said user service part are available, and if so immediately transferring said user service part; and f. repeating said method steps d and e until it is established that the network's available resources currently match that of the network resources required for the provisioning of said user service part, and then transferring said user service part.

17. A method according to claim 12, wherein the step of establishing whether said user service part would be transferred immediately, is based upon a determination whether traffic load associated with one or more entities operative along a path extending between the provider of the required service and the user's communication terminal, does not exceed a pre-defined threshold.

18. The method according to claim 16, wherein the step of establishing whether said user service part would be transferred immediately, is based upon information retrieved from at least one agent located at the user side or the provider side or at both sides, and operative to assess period of time required to convey data from one side of a path extending between the provider of the required service and the user's communication terminal, to the other.

19. The method according to claim 16, wherein the step of establishing whether said user service part would be transferred immediately, is based upon measuring the latency of data transfer over a low-priority connection.

20. The method according to claim 16, wherein the step of establishing whether said user service part would be transferred immediately, is based upon a response transmitted by a base station to a communication terminal's request to establish a new data connection.

\* \* \* \* \*